Patented Mar. 23, 1943

2,314,758

UNITED STATES PATENT OFFICE 2,314,758

REFRACTORY COMPOSITION

Milton H. Berns, Blasdell, N. Y., assignor to Electro Refractories & Alloys Corporation, Buffalo, N. Y.

No Drawing. Application July 10, 1940, Serial No. 344,779

8 Claims. (Cl. 106—44)

This invention relates to improvements in refractory compositions of the type suitable for making articles of the super-refractory type, which have considerable strength at high temperatures. Such compositions may, for example, be employed in slabs, posts and similar articles for use for supporting dinnerware and other ceramic products during the firing of the same, or in fire brick and special shapes for other purposes.

Heretofore refractory articles and parts have been produced chiefly from clay, clay bonded silicon carbide or clay bonded mullite. All of these articles have disadvantages which preclude or inhibit their use in certain cases. For example, both clay and clay bonded mullite have relatively low strength, particularly at high temperatures, which necessitates that the articles must be made of relatively large thickness, which reduces the volume within the kiln available for the ware. Furthermore, due to this low strength at high temperatures, it is impossible to use either of these materials at temperatures above 2100° F., since both tend to warp and crack above this temperature. In addition, fire clay materials are very sensitive to heat shock which results in above normally high rejection both to the articles made from these compositions and to the ware supported thereby.

Clay bonded silicon carbide articles, on the other hand, do not have these disadvantages and have very high strength and retain this strength admirably well even at temperatures in the vicinity of 2800° F. Silicon carbide articles of this type, however, are very prone to oxidation as indicated by the following reaction: $SiC + 2O_2 \rightarrow SiO_2 + CO_2$. When oxidation occurs, these clay bonded silicon carbide articles grow in size due to the lower specific gravity of the $SiO_2$ produced from the SiC. This results in very considerable weakening and usually in the cracking of the articles and greatly increases the sensitivity to heat shock. Clay bonded silicon carbide articles also have a tendency to drip or spit at elevated temperatures, in which case a glassy material exudes from the article and drips on the ware below or spits up on ware supported above the article. This causes discoloration and rejection of the ware thus affected.

In general, the chief properties desired in refractory material for use in supporting structure in kilns, such as the superstructure for tunnel kiln cars are:

1. High strength, even at elevated temperatures to enable the articles to carry the load applied thereto without warpage or cracking due to high tensile stresses developed in the supporting structure.

2. Good resistance to thermal shock, which is important, since the supporting structure for the ware is subjected to thermal shocks of varying degrees of intensity, either regularly or occasionally. If the material of the supporting structure does not have sufficient resistance to withstand this shock, cracking occurs which frequently results in a rejection not only of the supporting medium but also of a considerable amount of the ware. It has been found that the resistance of a body to thermal shock depends largely upon its strength and its rigidity. Other factors which enter into this resistance are the co-efficient of thermal expansion, thermal conductivity, density and specific heat. Two important factors in preventing thermal shock are rigidity and tensile strength. The rigidity of a refractory article may be measured by the modulus of elasticity (Young's Modulus of Elasticity). The greater the tensile strength, the greater is the resistance of the article to thermal shock, since the tensile strength resists the pulling apart of the article when subjected to thermal shock. On the other hand, the greater the modulus of elasticity, the lower is the resistance to thermal shock, due to the greater rigidity of the material.

3. Complete freedom from spitting or dripping is very essential, since most ware must be rejected when contaminated even by the slightest impurity, and substantially the only real cause of such impurities is from the refractory of which the supporting structure for the ware is made, and consequently, extreme care must be exercised in selecting refractories which can in no way contaminate the ware placed thereon.

4. Freedom from growth, which occurs chiefly in silicon carbide refractories and is quite objectionable in that it either appreciably weakens the articles in which growth has taken place, or it necessitates the cutting off of the article to reduce it to the size in which it was originally made, which is a troublesome and expensive operation. Growth sometimes occurs in clay bonded mullite articles where the mullite has been insufficiently calcined. As is well known, mullite is commonly formed from minerals such as cyanite, andalusite, sillimanite, and dumortierite and these materials expand on calcination. If the calcination has not been thoroughly accomplished, further calcination will take place when the formed articles are heated during service, which will, consequently, result in expansion which will produce growth.

One of the objects of this invention is to provide an improved refractory composition of the super-refractory type which will combine high strength, good resistance to thermal shock, freedom from spitting or dripping and freedom from growth. Another object of this invention is to provide a refractory article containing silicon carbide, and which is so formed that the silicon carbide grains are protected against oxidation. A further object is to provide a composition of this type in which the silicon carbide grains in the composition are protected by a coating of mullite, thus preventing oxidation of the silicon carbide and eliminating growth of the finished articles, as well as dripping or spitting. A further object of this invention is to provide a process of producing refractory articles of this type. Other objects of this invention will appear from the following description and claims.

In the practice of this invention, I make a mixture of silicon carbide and/or silicon carbide fire sand with a sufficient quantity of mullite and/or a material capable of producing mullite so that the silicon carbide particles will be practically enveloped in a strong protective coating of mullite. Mullite is an artificial mineral composed theoretically of about 72% of alumina and 28% of silica and is easily recognized under a petrographic microscope by its characteristic fibrous structure. Mullite may be formed in any suitable or desired manner by calcining or fusing alumina and silica or materials containing them in the proper proportions. Certain minerals may be used for this purpose which contain approximately the desired proportions of alumina and silica, such for example as cyanite, andalusite, sillimanite, and dumortierite. Mullite may also be produced by calcining clay and alumina, clay and bauxite, or alumina and silica directly, or by any other combination or mixture of materials in which mixture approximately the correct proportions of alumina and silica are present. In commercial practice, pure mullite is rarely produced, the commercial product being usually 95% or less in mullite content. Consequently, the mullite forming material may contain from 60% to 80% of alumina and from 20% to 40% of silica to produce satisfactory articles according to this invention.

It is well known that minerals such as cyanite, andalusite, sillimanite and dumortierite expand on calcination, and consequently, it is very desirable in the production of refractory articles according to my invention to calcine these minerals before incorporating them in the mixture with silicon carbide, so that most of the alumina and silica contained in the minerals will be converted into mullite, and then crushing the resulting material to the desired grain size. Mullite is commonly produced from these minerals at temperatures ranging from 2100° F. to 2700° F. In this preliminary calcination, it is not necessary that all of the mullite forming materials be converted into mullite, since it is not objectionable to have a small portion of the mullite produced during the final firing of the articles.

The mixture for producing articles embodying this invention may include from 30% to 75% of silicon carbide, preferably of a grain size of 10 mesh and finer, although somewhat coarser silicon carbide grains can be used. The quantity of mullite or mullite producing material in the mixture may vary from about 15% to about 60% and is preferably in more finely divided form than the silicon carbide. Mullite and mullite producing material capable of passing through 100 mesh screen has been found to be very satisfactory, although somewhat coarser grain sizes may be employed. Water is then added to the mixture of the silicon carbide and mullite or mullite producing material, and if desired, a suitable temporary organic binder may be added in sufficient quantity to make it possible to form the material into the desired shapes and to hold them in such shapes during calcining. I have found it desirable in many cases to add to the mixture a relatively small quantity of a bonding clay, for example, approximately 10%. It is possible, however, to use as much as 25% of a refractory bonding clay, if desired, for certain purposes. For this purpose, any suitable clay may be employed, such for example as English china clay, Kentucky ball clay, or Tennessee bond clay, all of which clays have a high alumina content.

The amount of water added to the mixture depends upon the process used for forming the articles into the desired shapes and the mixture with the water should be agitated until it is of uniform consistency. For example, if the articles are formed by pressing or jolting, about 5% by weight of water is sufficient, but when the articles are formed by casting, as much as 15% to 20% of water may be necessary. The material may be pressed, tamped, or jolted in a suitable mold, which may be made of metal or wood, or it may be cast as a slip in a plaster of Paris mold. All of these methods of forming the articles into the desired shape are well known to those skilled in the art.

After the article has been formed, it is carefully dried and then fired at a temperature of about 2600° F. or more. If a bonding clay is employed, the articles are usually fired at a temperature high enough to vitrify or partially vitrify the particular bonding clay employed. Some additional formation of mullite frequently occurs during the final firing, this probably resulting from further formation of mullite from materials in the natural mineral which had not been completely transformed into mullite during the original firing, or from alumina and silica contained in the clay or from alumina or silica of the clay reacting with such alumina or silica of the mullite producing mineral which had not been converted into mullite during the initial firing. This additional production of mullite during the final firing does not cause any distortion of the articles due to growth of the same, since this growth takes place only during the initial calcining of mullite producing minerals, and does not take place in the final articles if the mullite producing minerals are initially sufficiently calcined.

The following examples of mixtures of ingredients for making the finished articles in accordance with my invention have been found very satisfactory, but it is to be understood that it is not intended to limit this invention to the specific examples herein given, since it must be borne in mind that the percentages of the materials and the grain sizes may be varied greatly, depending upon the service in which the articles are to be used. In these examples, silicon carbide fire sand may be used in place of some or all of the silicon carbide, and the words "silicon carbide" as used in this description and in the claims are intended to include silicon carbide fire sand.

*Example I*

| | Per cent |
|---|---|
| Silicon carbide grain 10 mesh and finer | 50 |
| Calcined cyanite 100 mesh and finer | 40 |
| Kentucky ball clay | 10 |
| | 100 |

*Example II*

| | Per cent |
|---|---|
| Fused cyanite 10 mesh and finer | 35 |
| Silicon carbide 10 mesh and finer | 35 |
| Calcined cyanite 100 mesh and finer | 20 |
| Kentucky ball clay | 10 |
| | 100 |

*Example III*

| | Per cent |
|---|---|
| Silicon carbide grain 10 mesh and finer | 70 |
| Calcined cyanite 100 mesh and finer | 20 |
| Kentucky ball clay | 10 |
| | 100 |

The following table shows properties of my improved composition made in accordance with Examples I, II and III, as compared with compositions heretofore made. In this table "SiC body" is a standard silicon carbide mixture containing 90% silicon carbide and 10% of bonding clay. The "mullite" body is made from 90% calcined cyanite and 10% bonding clay. The "fireclay" body was made of a standard fireclay, such as commonly used in making fire brick. The "tensile strength" and "modulus of elasticity" are in pounds per square inch, and the temperatures are in degrees Fahrenheit. The column headed "R at 1500°" indicates the resistance to thermal shock and the figures in this column are obtained by means of the following formula developed by Winkelman and Schott and in common use in the industry.

$$R = \frac{P\sqrt{K}}{\Delta E \sqrt{ec}}$$

Where:
- R = resistance to spalling.
- P = tensile strength in pounds per square inch.
- K = thermal conductivity in B. t. u. per square foot per hour per 1 inch thickness per degrees F.
- $\Delta$ = coefficient of expansion in inches per inch per degrees F.
- E = modulus of elasticity in pounds per square inch.
- e = density of the piece in grams per cubic centimeter.
- c = specific heat in calories per gram.

The figures in this column also indicate the resistance to spalling.

| | Tensile strength | | | | Modulus of elasticity at 1500° | R at 1500° |
|---|---|---|---|---|---|---|
| | 80° | 1500° | 2000° | 2400° | | |
| SiC body | 755 | 1175 | 755 | 605 | $7.20 \times 10^6$ | 475 |
| Mullite | 245 | 354 | 301 | 181 | $1.70 \times 10^6$ | 212 |
| Fireclay | 400 | 215 | 152 | | $4.50 \times 10^6$ | 24 |
| Example I | 840 | 760 | 600 | 575 | $4.78 \times 10^6$ | 310 |
| Example II | 680 | 830 | 460 | 245 | $5.10 \times 10^6$ | 304 |
| Example III | 885 | 995 | 700 | 335 | $5.50 \times 10^6$ | 518 |

In aiddtion to the information contained in the above table, which shows very clearly the beneficial properties of the refractory composition produced in accordance with Examples I, II and III herein given, tests on the materials listed in the above table showed articles made in accordance with my invention were free from any appreciable growth, so that evidently the mullite encased the silicon carbide grains to such an extent that oxidation of the silicon carbide was prevented at all temperatures. The tests also showed that the silicon carbide body produced very decided spitting and dripping at elevated temperatures. The mullite and fire clay bodies and the bodies formed in accordance with Examples I and II showed no spitting or dripping whatever. The body made in accordance with Example III showed a very slight stain at 2700° F., but none whatever below that temperature.

The foregoing table shows clearly that while the silicon carbide body is slightly superior in tensile strength and resistance to spalling than some of the bodies produced in accordance with this invention, yet these advantages of the silicon carbide body are overcome by the objectionable properties of growth of the body and of spitting and dripping. The fact that the modulus of elasticity of bodies made in accordance with my invention is lower than the silicon carbide body is also of advantage, in that this results in a relatively high resistance to thermal shock and spalling. Kiln furniture made in accordance with my invention is, therefore, decidedly superior to that made as heretofore with silicon carbide, since it is entirely free from any objectionable growth and is entirely free from spitting and dripping at ordinary kiln temperatures, and is superior to bodies made mainly of mullite in that they are greatly superior in strength and resistance to spalling and thermal shock. Articles made in accordance with my invention are, therefore, much more satisfactory for use as kiln furniture in that they are more durable and have longer life in kilns, and decrease materially the quantity of ware which must be rejected because of spitting or dripping.

In the making of articles in accordance with my process, by calcining the mullite producing materials to convert the greater part thereof into mullite before incorporating the materials into the mixture from which the final articles are formed, there is no objectionable distortion or changing of shape of the articles during the final firing, so that the articles produced are strong and rigid and there is comparatively small loss due to damage of articles during the final firing.

I claim as my invention:

1. A refractory composition for supporting loads at high temperatures, consisting of silicon carbide, mullite in sufficient quantity to encase the particles of silicon carbide with a protective coating of mullite, and approximately ten per cent of a vitrified clay binder.

2. A fired refractory load supporting article consisting of from 30% to 75% of silicon carbide, from 15% to 60% of mullite, and not more than 25% of a vitrified clay binder.

3. A method of producing a refractory article, which includes heating a mass containing from 60% to 80% of alumina and from 20% to 40% of silica to a temperature in excess of 2000° F. to convert the greater part of the mass into mullite, reducing the fired mass, after cooling, to grain size, mixing the mass with silicon carbide grain, adding water and a binder to said mixture, forming the mixture into articles of the desired shapes, and firing the articles at temperatures in excess of 2500° F. to produce additional mullite and to vitrify the clay bond, whereby the mullite forms a protective covering for the silicon carbide particles.

4. A method of producing a refractory article, which includes heating a natural mineral containing from 60% to 80% of alumina and from 20% to 40% of silica to a temperature sufficient to convert the greater part of the mineral into mullite, reducing the fired mass to grain size, forming a mixture of said grain with at least an equal quantity of silicon carbide grain, adding water and a binder to the mixture, forming the mixture into articles of the desired shapes, and firing the articles at a temperature sufficient to produce additional mullite and to form a protective coating of mullite over the silicon carbide particles.

5. A method of producing a refractory article, which includes heating a mass containing from 60% to 80% of alumina and from 20% to 40% of silica to a temperature sufficient to convert the greater part of the mass into mullite, reducing the fired mass, after cooling, to grain size, mixing the mass with silicon carbide grain, adding water and a bonding clay binder to said mixture, forming the mixture into articles of the desired shapes, and firing the articles at temperatures sufficient to produce additional mullite which stimulates inter-crystal growth of the mullite grain in the composition and whereby the mullite forms a protective covering for the silicon carbide particles.

6. A method of producing a bonded refractory article, which includes heating a mass containing from 60% to 80% of alumina and from 20% to 40% of silica to a temperature sufficient to convert the greater part of the mass into mullite, reducing the fired mass after cooling approximately to a size capable of passing through a 100 mesh screen, mixing the mass with silicon carbide grain approximately of a size capable of passing through a 10 mesh screen, adding water and a clay binder to said mixture, forming the mixture into articles of the desired shapes and firing the articles at temperatures, in excess of 2500° F. to produce additional mullite which stimulates inter-crystal growth of the mullite grain in the composition and to cause the mullite to form a protective covering on the silicon carbide particles.

7. A method of producing a bonded refractory article, which includes heating a mass containing from 60% to 80% of alumina and from 20% to 40% of silica to a temperature sufficient to convert the greater part of the mass into mullite, reducing the fired mass after cooling approximately to a size capable of passing through a 100 mesh screen, mixing the mass with silicon carbide grain approximately of a size capable of passing through a 10 mesh screen, adding water and approximately 10% of a bonding clay to the mixture, forming the mixture into articles of the desired shapes, and firing the articles at temperatures sufficient to vitrify the bonding clay and to form additional mullite which stimulates inter-crystal growth of the mullite grain in the composition, whereby the mullite forms a protective covering on the silicon carbide particles.

8. A method of producing a refractory fired article, which includes making a mixture from 30% to 75% of silicon carbide grain and from about 15% to 60% of materials including approximately 60% of alumina and 40% silica, at least a part of which is in the form of mullite before firing, forming the mixture into articles of the desired shapes and firing the articles at a temperature of at least 2600° F. to convert additional alumina and silica in the mixture into mullite.

MILTON H. BERNS.